(12) United States Patent
Sudo

(10) Patent No.: US 9,744,906 B2
(45) Date of Patent: Aug. 29, 2017

(54) VEHICLE INFORMATION NOTIFICATION DEVICE

(71) Applicant: MITSUBISHI ELECTRIC CORPORATION, Tokyo (JP)

(72) Inventor: Takashi Sudo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/120,252

(22) PCT Filed: Mar. 28, 2014

(86) PCT No.: PCT/JP2014/059164
§ 371 (c)(1),
(2) Date: Aug. 19, 2016

(87) PCT Pub. No.: WO2015/145731
PCT Pub. Date: Oct. 1, 2015

(65) Prior Publication Data
US 2017/0072849 A1   Mar. 16, 2017

(51) Int. Cl.
*B60Q 1/00* (2006.01)
*B60Q 9/00* (2006.01)
*G08B 21/00* (2006.01)

(52) U.S. Cl.
CPC ............... *B60Q 9/00* (2013.01); *G08B 21/00* (2013.01); *H04R 2499/13* (2013.01)

(58) Field of Classification Search
None
See application file for complete search history.

(56) References Cited

U.S. PATENT DOCUMENTS

| 5,635,903 A | 6/1997 | Koike et al. |
| 9,171,447 B2 * | 10/2015 | Davis ..................... G08G 1/005 |
| 9,469,247 B2 * | 10/2016 | Juneja ..................... B60Q 9/00 |
| 2010/0033313 A1 * | 2/2010 | Keady .................. G08G 1/0965 340/438 |
| 2015/0235554 A1 * | 8/2015 | Kaminade ................ G08G 1/01 340/943 |

FOREIGN PATENT DOCUMENTS

| JP | 5-204388 A | 8/1993 |
| JP | 7-182587 A | 7/1995 |
| JP | 9-159482 A | 6/1997 |
| JP | 2002-288772 A | 10/2002 |
| JP | 2005-70894 A | 3/2005 |

* cited by examiner

*Primary Examiner* — Adolf Dsouza
(74) *Attorney, Agent, or Firm* — Birch, Stewart, Kolasch & Birch, LLP

(57) ABSTRACT

A vehicle information notification device includes a sound signal analyzer to analyze the notification sound outputted from a first notifier, a system controller to control the operation of the first notifier, an abnormality determiner to determine an operation abnormality of the first notifier on the basis of an analysis result acquired by the sound signal analyzer, and to, when determining that the first notifier is operating normally, determine whether an S/N ratio of the notification sound outputted from the first notifier to ambient noise reaches a permitted level, and a notification controller to cause a second notifier to notify information when it is determined that the first notifier is not operating normally or that the S/N ratio does not reach the permitted level.

6 Claims, 6 Drawing Sheets

VEHICLE INFORMATION NOTIFICATION DEVICE

FIELD OF THE INVENTION

The present invention relates to a vehicle information notification device that notifies information about the driving state, the surrounding conditions, etc. of a vehicle to passengers.

BACKGROUND OF THE INVENTION

A vehicle information notification device is mounted in a vehicle and notifies various pieces of information which are acquired by the vehicle to the driver. The information notified to the driver includes the driving state and the surrounding conditions of the vehicle. For example, when the vehicle enters an intersection, the vehicle information notification device notifies warning information to the driver to call attention to other vehicles. The information notified to the driver in this way includes the driving state and the surrounding conditions of the vehicle which are notified to the driver in real time and is used for subsequent driving actions in many cases.

Further, there is a possibility that in the case of using a technique to display information on a vehicle-mounted display, such as a center display, and notify the information, as means of notifying information to the driver, the driver's attention is directed to the vehicle-mounted display, so that the forward visibility of the driver is restricted. Therefore, the means of notifying information to the driver is typically one using a sound. The information notified to the driver is used for the driver's driving action in many cases, as mentioned above, and it is therefore necessary to certainly notify the information to the driver in real time.

On the other hand, in the case of making a notification using a sound, the notification sound is buried in ambient noise and it becomes impossible for the driver to recognize the notification sound not only when an operation failure occurs in a sound output system, such as a speaker or an amplifier, and the notification sound cannot be outputted, but also when the surrounding noise level is high. Therefore, the vehicle information notification device needs to have a function of performing a self-diagnosis of whether the vehicle information notification device can make a notification precisely.

For example, patent reference 1 discloses a device that performs a self-diagnosis of whether or not a notification sound is outputted normally by performing sound output of a predetermined acoustic loop back signal, and collecting this acoustic loop back signal. In order to avoid an erroneous determination due to the mixing of external noise in the acoustic loop back signal, this device determines that an abnormality has occurred when the number of detections of the abnormality becomes equal to or larger than a predetermined number after repeatedly performing the above-mentioned abnormality diagnosis two or more times. In this way, the device achieves an improvement in the reliability of the abnormality diagnosis.

RELATED ART DOCUMENT

Patent Reference

Patent reference 1: Japanese Unexamined Patent Application Publication No. 2002-288772

SUMMARY OF THE INVENTION

Problems to be Solved by the Invention

In the conventional technique represented by patent reference 1, the abnormality diagnosis is repeatedly performed two or more times to finally determine the occurrence of an abnormality, as mentioned above.

However, when notifying the driving state and the surrounding conditions of the vehicle to the driver in real time by using a notification sound, it is necessary to also perform a diagnosis, in real time, of whether or not the notification sound has been outputted normally, or whether or not the outputted notification sound has been caught precisely by the driver. Therefore, the invention, as described in patent reference 1, of repeatedly performing an abnormality diagnosis cannot be applied.

A problem with the conventional technique is that when the notification sound is not outputted normally and when the notification sound is not caught precisely by the driver because of ambient noise, notification information cannot be notified in real time.

The present invention is made in order to solve the above-mentioned problem, and it is therefore an object of the present invention to provide a vehicle information notification device that can precisely notify information which requires the real-time nature for notification timing to passengers in a vehicle.

Means for Solving the Problem

According to the present invention, there is provided a vehicle information notification device that can switch between a first notifier to output a notification sound, thereby notifying information to passengers in a vehicle in an acoustic manner, and a second notifier to notify information in a sensory manner other than an acoustic manner, to make a notification of information, the vehicle information notification device including: a sound signal analyzer to analyze the notification sound outputted from the first notifier; a first notification controller to control the operation of the first notifier; an abnormality determiner to determine an operation abnormality of the first notifier on the basis of an analysis result acquired by the sound signal analyzer, and to, when determining that the first notifier is operating normally, determine whether the S/N ratio of the notification sound outputted from the first notifier to ambient noise reaches a permitted level; and a second notification controller to cause the second notifier to notify information when it is determined that the first notifier is not operating normally or that the S/N ratio does not reach the permitted level.

Advantages of the Invention

According to the present invention, there is provided an advantage of being able to precisely notify information which requires the real-time nature for notification timing to passengers in the vehicle.

EMBODIMENTS OF THE INVENTION

Hereafter, in order to explain this invention in greater detail, the preferred embodiments of the present invention will be described with reference to the accompanying drawings.

Embodiment 1

Figure 1:
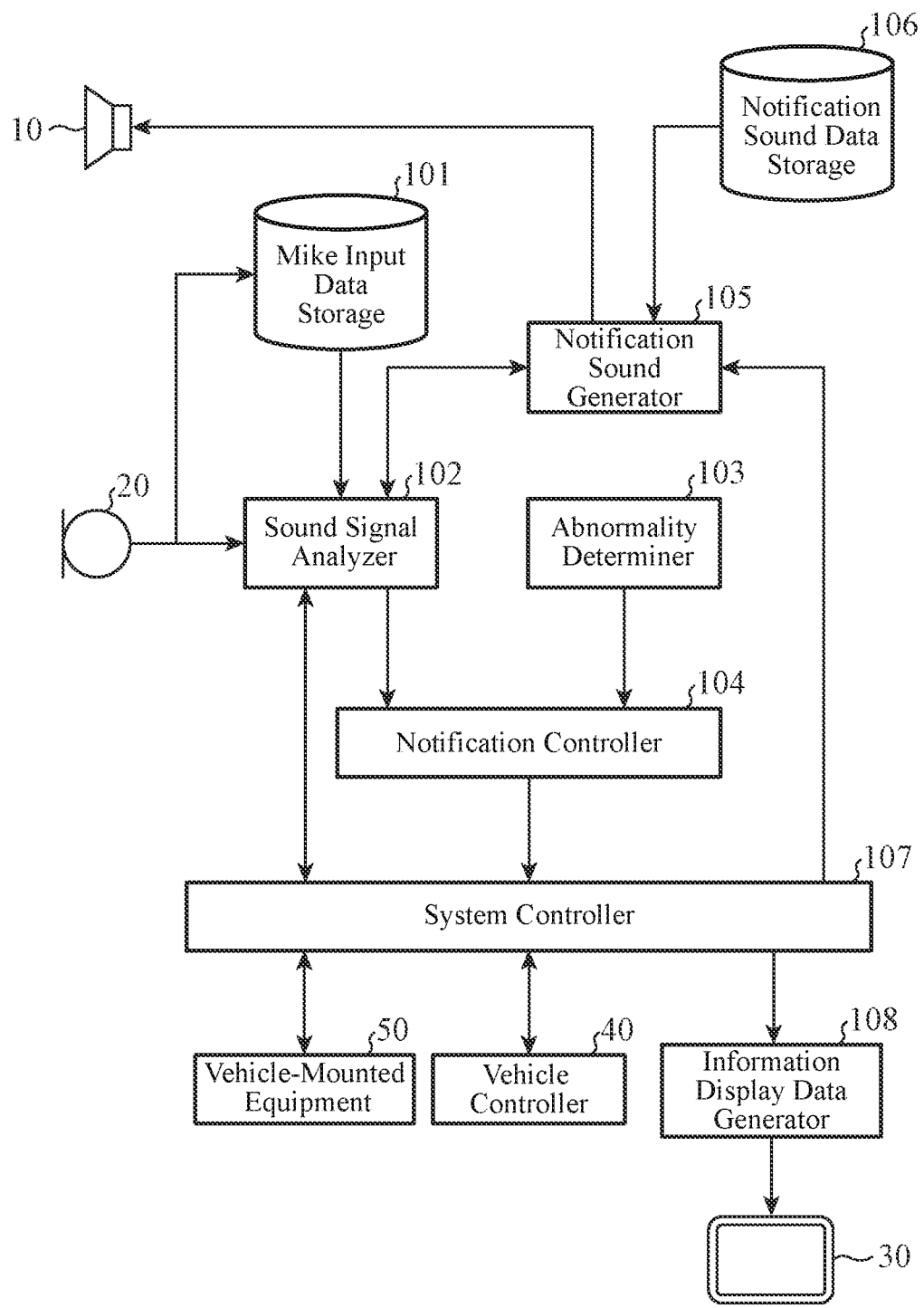
FIG. 1 is a block diagram showing the configuration of a vehicle information notification system to which a vehicle information notification device according to Embodiment 1 of the present invention is applied.

FIG. 1 is a block diagram showing the configuration of a system to which a vehicle information notification device according to Embodiment 1 of the present invention is applied. The system shown in FIG. 1 is a vehicle information notification system which is mounted in a vehicle, and which notifies various pieces of information acquired by the vehicle to passengers such as the driver. The vehicle information notification system includes, in addition to a speaker 10, a microphone 20 and a vehicle-mounted display 30, the vehicle information notification device according to Embodiment 1, as its components.

The vehicle information notification device outputs a notification sound to notify information to passengers in an acoustic manner, and includes a mike input data storage 101, a sound signal analyzer 102, an abnormality determiner 103, a notification controller 104, a notification sound generator 105, a notification sound data storage 106, a system controller 107, and an information display data generator 108.

The notification sound is outputted via the speaker 10 equipped in the vehicle. The notification sound is a tone, a chime or a melody sound which is assigned to the descriptions of the information acquired by the vehicle, or can be a voice message showing the descriptions of the information. The microphone 20 is equipped in the vehicle, and collects sounds in the vehicle, the sounds including a passenger's utterance, the notification sound and ambient noise.

The vehicle-mounted display 30 is mounted in the vehicle. For example, the vehicle-mounted display can be a center display arranged on a front center, an instrument panel display that displays an image of instruments of the vehicle, or a head up display. As an alternative, the vehicle-mounted display 30 can be the display of a device (a mobile terminal or a tablet PC) which is carried into the vehicle by a passenger.

The vehicle controller 40 controls travelling and a stop of the vehicle according to the driver's operation. The vehicle controller 40 also outputs vehicle information showing the travelling state of the vehicle to the system controller 107. The vehicle information notification device outputs a notification sound on the basis of the vehicle information, under the control by the system controller 107. For example, when the vehicle speed is acquired as the vehicle information, and the vehicle speed falls within a predetermined overspeed range, the vehicle information notification device outputs a notification sound for providing a warning about an overspeed from the speaker 10.

The vehicle-mounted equipment 50 is electronic equipment mounted in or carried into the vehicle. For example, a navigation device, an audio device with a display, or a vibration generating device which is mounted in the driver's seat, the steering wheel or the like, and which calls the driver's attention by vibration can be provided.

The mike input data storage 101 stores a sound signal (referred to as mike input data from here on) which is collected by the microphone 20. In the mike input data storage 101, the mike input data is stored only during a predetermined period of time. For example, mike input data about sounds which are collected during several seconds is stored in the mike input data storage 101.

The sound signal analyzer 102 analyzes the mike input data collected by the microphone 20 and the mike input data stored in the mike input data storage 101, and performs a signal analysis, such as an estimation of the S/N ratio of the notification sound (Signal) to the ambient noise (Noise) and a frequency analysis of the ambient noise. The estimated S/N ratio is outputted from the sound signal analyzer 102 to the abnormality determiner 103 and the notification controller 104.

The abnormality determiner 103 determines whether or not the notification sound is normally outputted from the speaker 10 on the basis of an analysis result acquired by the sound signal analyzer 102. For example, the sound signal analyzer 102 compares the notification sound extracted from the mike input data with the notification sound data stored in the notification sound data storage 106, to determine whether or not a correct notification sound is outputted.

The notification sound is generated by the notification sound generator 105 in accordance with a command from the system controller 107, and is outputted from the speaker 10. Therefore, the speaker 10 serves as a first notifier, and the system controller 107 serves as a first notification controller to control the notification sound generator 105 and the notification sound data storage 106, to notify information to passengers in the vehicle in an acoustic manner. The abnormality determiner 103 determines an operation abnormality of the first notifier.

When determining that the first notifier is operating normally, the abnormality determiner 103 determines whether the S/N ratio of the notification sound to the ambient noise, the S/N ratio being outputted from the first notifier, reaches a permitted level. The above-mentioned S/N ratio is estimated by the sound signal analyzer 102 and is outputted to the abnormality determiner 103. The above-mentioned permitted level is, for example, a lower limit on the S/N ratio at which the notification sound can be recognized by passengers even if ambient noise exists.

The notification controller 104 serves as a second notification controller to, when the abnormality determiner 103 determines that the first notifier is not operating normally or that the above-mentioned S/N ratio does not reach the above-mentioned permitted level, cause a second notifier that notifies information in a sensory manner other than an acoustic manner to notify information to passengers.

The notification made in a sensory manner other than an acoustic manner is one made in a visual or tactile manner. For example, the contents of the notification are displayed on the vehicle-mounted display 30, the vehicle controller 40 is caused to perform vehicle control corresponding to the contents of the notification, or a vibration generating device generates a vibration corresponding to the contents of the notification.

For example, display data about the contents of the notification, which is generated by the information display data generator 108, is displayed on the vehicle-mounted display 30. Therefore, the vehicle-mounted display 30 and the information display data generator 108 serve as the second notifier to notify the information to passengers in a visual manner.

Further, the system controller 107 causes the vehicle controller 40 to perform vehicle control (e.g., brake pumping for notifying an overspeed) corresponding to the contents of the notification in accordance with a command from the notification controller 104. Therefore, the vehicle controller 40 serves as the second notifier to notify the information in a sensory manner other than an acoustic manner, too. In addition, the vehicle-mounted equipment 50, such as a vibration generating device, serves as the second notifier to notify the information to passengers in a tactile manner.

The notification sound generator 105 generates a notification sound signal corresponding to the analysis result acquired by the sound signal analyzer 102 by using notification sound data read from the notification sound data storage 106, in accordance with a notification sound output command inputted thereto from the system controller 107. The notification sound data is one about the source of the notification sound, and is one about one of various tones, a chime, a melody sound, or a voice.

The notification sound data storage 106 stores a plurality of notification sound data respectively corresponding to various notification contents.

The system controller 107 determines notification contents and a notification timing on the basis of the vehicle information inputted thereto from the vehicle controller 40 and showing the travelling state of the vehicle, generates a notification sound output command showing these notification contents, and issues the notification sound output command to the notification sound generator 105 and the sound signal analyzer 102.

The information display data generator 108 is activated in accordance with a command from the notification controller 104, and generates display data about the notification contents determined by the system controller 107.

The sound signal analyzer 102, the abnormality determiner 103, the notification controller 104, the notification sound generator 105, the system controller 107 and the information display data generator 108 are implemented as concrete units in each of which hardware and software work in cooperation with each other, by, for example, causing a microcomputer to execute a program in which processes specific to this Embodiment 1 are described. Further, the mike input data storage 101 and the notification sound data storage 106 are configured in, for example, a flash memory, a hard disk drive (HDD) device, a USB memory or the like which is mounted in the computer which functions as the vehicle-mounted information notification device according to Embodiment 1.

Next, operations will be explained.

Figure 2:
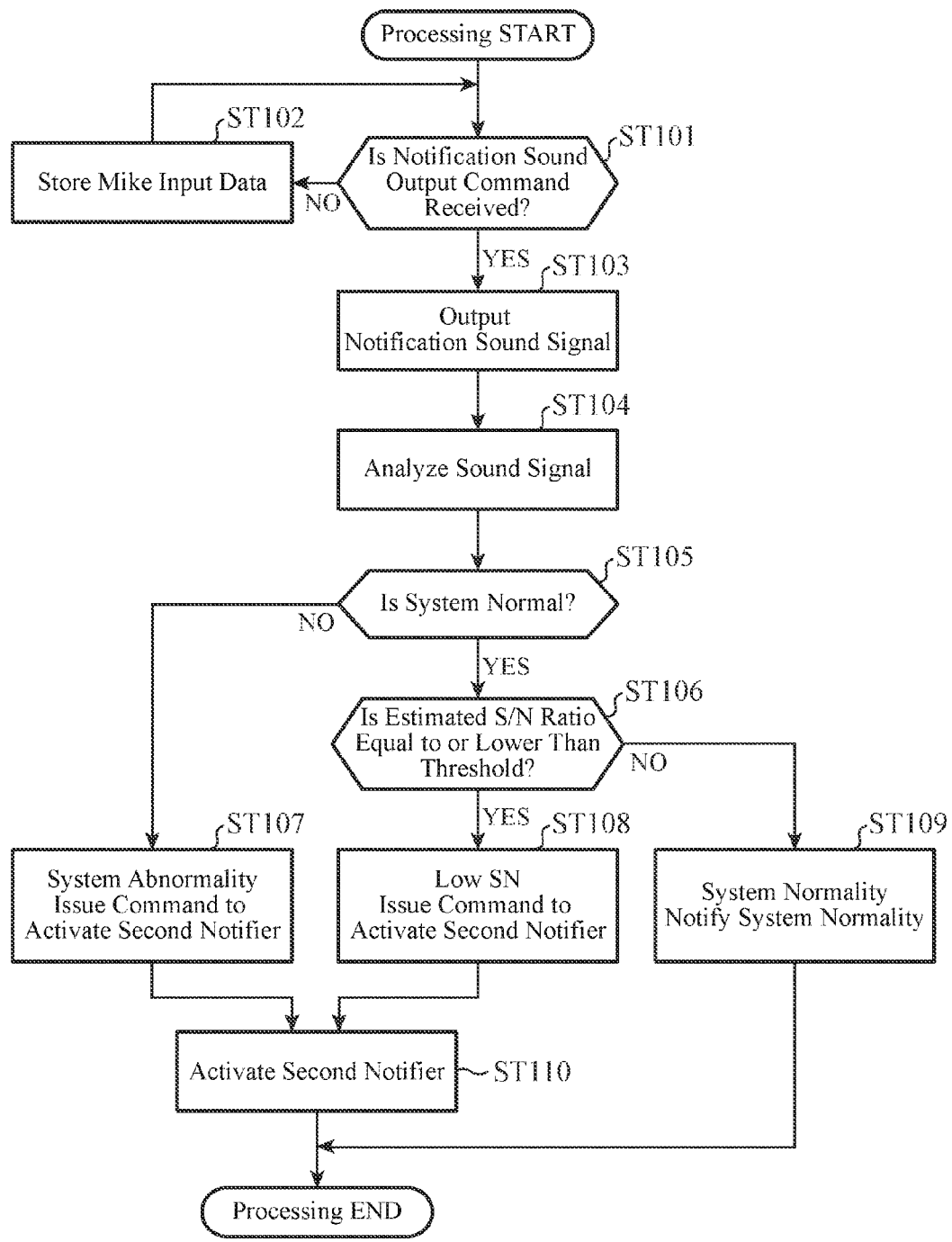
FIG. 2 is a flow chart showing the operation of the vehicle information notification device according to Embodiment 1.

FIG. 2 is a flowchart showing the operation of the vehicle information notification device according to Embodiment 1, and shows the details of the notifying process.

First, the mike input data storage 101 sequentially stores mike input data which has been collected by the microphone 20 during a fixed period of time (e.g., during approximately several seconds) preceding the current time (step ST102) while the notification sound generator 105 does not receive a notification sound output command from the system controller 107 (when NO in step ST101).

Further, when receiving a notification sound output command from the system controller 107 (when YES in step ST101), the notification sound generator 105 reads the notification sound data about the notification contents specified by the notification sound output command from the notification sound data storage 106, and generates a notification sound signal by using this notification sound data. A notification sound based on the notification sound signal is outputted from the speaker 10 (step ST103). Sounds in the vehicle including this notification sound are collected by the microphone 20.

The sound signal analyzer 102 analyzes the mike input data collected by the microphone 20 (step ST104). For example, the sound signal analyzer analyzes whether the mike input data includes the sound signal (the notification sound) corresponding to the notification sound signal generated by the notification sound generator 105. Further, when the sound signal corresponding to the notification sound signal is included in the mike input data, the sound signal analyzer 102 estimates the S/N ratio of the notification sound to the ambient noise.

The abnormality determiner 103 determines whether or not the sound output in the system is normal in accordance with an analysis result acquired by the sound signal analyzer 102 (step ST105). For example, the abnormality determiner determines whether or not the notification sound is normally outputted from the speaker 10 in accordance with an analysis result of analyzing whether or not the sound signal corresponding to the notification sound signal is included in the mike input data. More specifically, the abnormality determiner determines that an abnormality has occurred in the system when the notification sound is not collected, whereas the abnormality determiner determines that the system is normal when the notification sound is collected.

When determining that an abnormality has occurred in the system (when NO in step ST105), the abnormality determiner 103 notifies the system abnormality to the notification controller 104. When receiving the notification of the system abnormality from the abnormality determiner 103, the notification controller 104 issues a command to activate the second notifier to the system controller 107 (step ST107). According to the activate command from the notification controller 104, which is inputted thereto via the system controller 107, the second notifier is activated and makes a notification in a sensory manner other than an acoustic manner (step ST110).

For example, the information display data generator 108 is activated according to the activate command from the notification controller 104, and generates display data (a warning text, an icon or the like showing the abnormality in the system) about the notification contents specified by the system controller 107. This display data is displayed on the vehicle-mounted display 30, so that the notification contents are notified to the driver in a visual manner. Further, the vehicle-mounted equipment 50, such as the vibration generating device, is activated according to the activate command from the notification controller 104, and provides a vibration for the driver to notify the notification contents to the driver in a tactile manner. An indicating lamp of the vehicle-mounted equipment 50 can be made to light up.

In contrast, when determining that the system is normal (when YES in step ST105), the abnormality determiner 103 determines whether the S/N ratio of the notification sound to the ambient noise, the S/N ratio being estimated by the sound signal analyzer 102, is equal to or lower than a predetermined threshold (step ST106). This threshold is a value less than a lower limit on the permitted level (a fixed level) of the S/N ratio of the notification sound to the ambient noise. When this S/N ratio is equal to or lower than the threshold, the inside of the vehicle is in a situation in which it is difficult for the driver to catch the notification sound because of the ambient noise.

When the S/N ratio of the notification sound to the ambient noise is equal to or lower than the threshold (when YES in step ST106), the abnormality determiner 103 notifies the notification controller 104 to this effect. When receiving the above-mentioned notification from the abnormality determiner 103, the notification controller 104 issues a command to activate the second notifier to the system controller 107, like in the case of occurrence of a system abnormality (step ST108).

The second notifier is activated according to the activate command inputted thereto via the system controller 107, and makes a notification in a sensory manner other than an acoustic manner (step ST110).

The vehicle information notification device thus activates the second notifier to make a notification in a sensory manner other than an acoustic manner in the situation in which it is difficult to catch the notification sound because of the ambient noise even if the system is normal, like in the case of occurrence of a system abnormality. As a result, the vehicle information notification device can precisely notify the information which requires the real-time nature for notification timing to passengers in the vehicle. For example, when the vehicle has performed self-driving for maintaining constant the distance between itself and any vehicle ahead because of a traffic jam, the vehicle information notification device can notify in real time that the vehicle has gotten out of the traffic jam. As a result, the vehicle information notification device enables the driver to precisely switch to manual driving. Further, also when providing a warning to urge the driver to perform safe driving when the vehicle enters an intersection, the vehicle information notification device can warn the driver at an appropriate timing.

When the S/N ratio of the notification sound to the ambient noise exceeds the threshold (when NO in step ST106), the abnormality determiner 103 notifies the notification controller 104 to this effect (step ST109). When receiving the above-mentioned notification from the abnormality determiner 103, the notification controller 104 does not issue a command to activate the second notifier. After that, the vehicle information notification device ends the processing.

As mentioned above, the vehicle information notification device according to this Embodiment 1 can switch between the first notifier, such as the speaker 10 and the notification sound generator 105, to output a notification sound, thereby notifying information to passengers in the vehicle in an acoustic manner, and the second notifier using the vehicle-mounted display 30 or the like to notify information in a sensory manner other than an acoustic manner, to make a notification of information, and includes: the sound signal analyzer 102 to analyze the notification sound outputted from the first notifier; the system controller 107 to control the operation of the first notifier; the abnormality determiner 103 to determine an operation abnormality of the first notifier on the basis of an analysis result acquired by the sound signal analyzer 102, and to, when determining that the first notifier is operating normally, determine whether the S/N ratio of the notification sound outputted from the first notifier to ambient noise reaches the permitted level; and the notification controller 104 to cause the second notifier to notify information when it is determined that the first notifier is not operating normally or that the S/N ratio does not reach the permitted level.

Because the vehicle information notification device thus activates the second communicator to make a notification in a sensuous manner other than an acoustic manner when an abnormality has occurred in the first notifier that transmits information in an acoustic manner or when the S/N ratio of the notification sound to the ambient noise is low and it is therefore difficult to catch the notification sound, the vehicle information notification device can precisely notify information which requires the real-time nature for notification timing to passengers in the vehicle.

Embodiment 2

In Embodiment 2, when the ambient noise in the frequency band of a notification sound has a level which cannot be permitted, a notification sound generator 105 changes the pitch (the sound height) of the notification sound.

While a vehicle information notification device according to Embodiment 2 has the configuration shown in Embodiment 1 basically, the internal processing of the notification sound generator 105 differs from that of the notification sound generator according to Embodiment 1. Therefore, the configuration of the vehicle information notification device according to Embodiment 2 will be explained with reference to FIG. 1.

Figure 3:
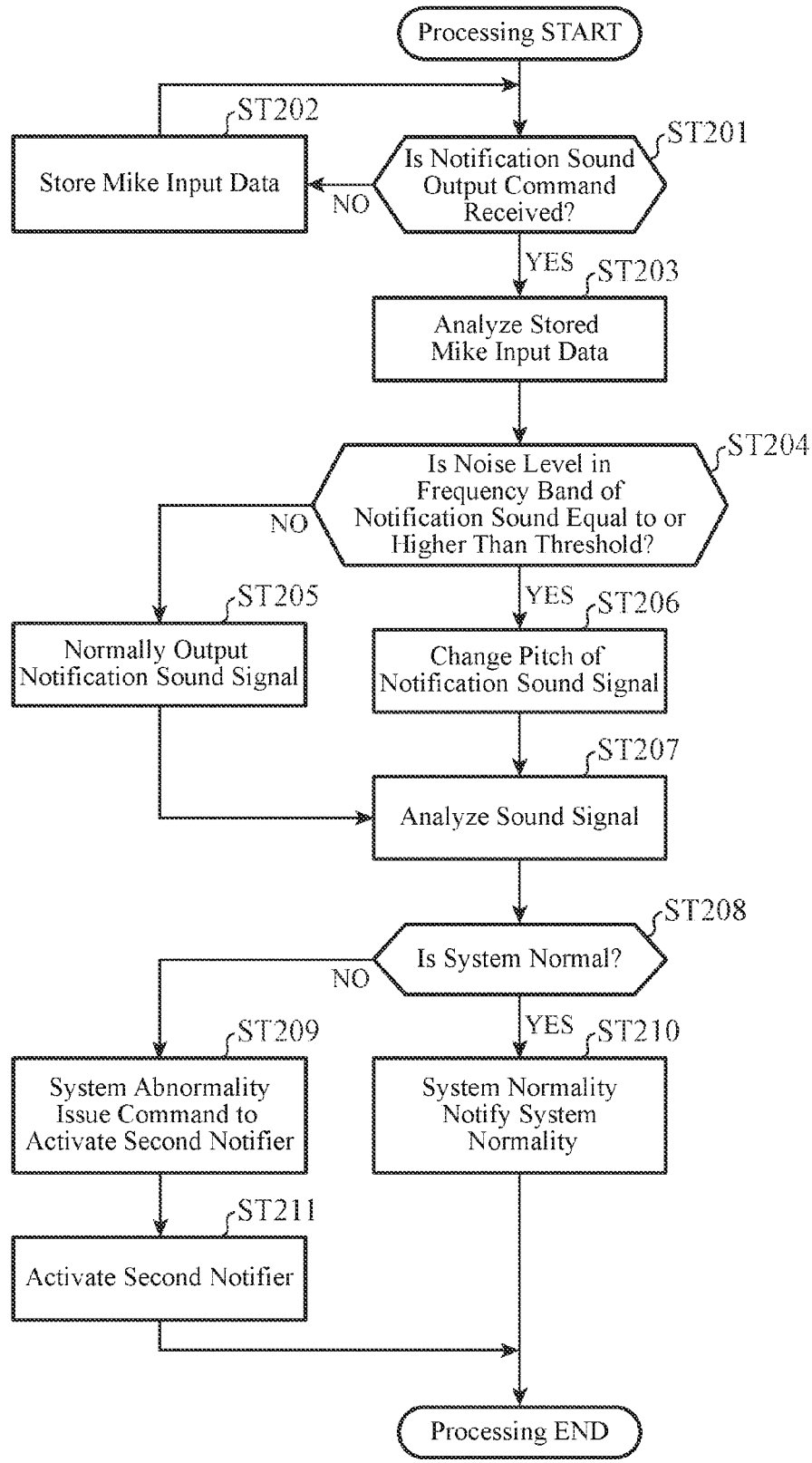
FIG. 3 is a flow chart showing the operation of a vehicle information notification device according to Embodiment 2 of the present invention.

FIG. 3 is a flowchart showing the operation of the vehicle information notification device according to Embodiment 2 of the present invention, and shows the details of a notifying process.

First, a mike input data storage 101 sequentially stores mike input data which has been collected by a microphone 20 during a fixed period of time (e.g., during approximately several seconds) preceding the current time (step ST202) while the notification sound generator 105 does not receive a notification sound output command from a system controller 107 (when NO in step ST201).

When the notification sound generator 105 receives a notification sound output command from the system controller 107 (when YES in step ST201), a sound signal analyzer 102 analyzes the mike input data stored in the mike input data storage 101 (step ST203). At this time, the sound signal analyzer 102 analyzes the sound pressure level of the notification sound and the sound pressure level of the ambient noise in the frequency band of the notification sound. The ambient noise includes an engine sound, road noise occurring due to the friction between the tires and the road surface, or the like, and wind noise which is caused by the travelling of the vehicle when the vehicle's window is open. Because the notification sound has a relatively high frequency in many cases, for example, the wind noise in a high frequency band acts as noise in the frequency band of the notification sound more easily than the road noise in a low frequency band.

The sound signal analyzer 102 then determines whether or not the noise level in the frequency band of the notification sound is equal to or higher than a threshold (step ST204).

When the noise level in the frequency band of the notification sound is lower than the threshold (when NO in step ST204), the sound signal analyzer 102 notifies the notification sound generator 105 and the system controller 107 to this effect.

When receiving the above-mentioned notification, the notification sound generator 105 reads the notification sound data about the notification contents specified by the notification sound output command received from the system controller 107 from a notification sound data storage 106, and generates a notification sound signal by using this notification sound data. The notification sound signal generated at this time is one of the notification sound which is predetermined by the notification sound data.

This notification sound signal is outputted normally from a speaker 10 (step ST205). Sounds in the vehicle including this notification sound are collected by the microphone 20.

In contrast, when the noise level in the frequency band of the notification sound is equal to or higher than the threshold (when YES in step ST204), the sound signal analyzer 102 notifies the notification sound generator 105 and the system controller 107 to this effect.

When receiving the above-mentioned notification, the notification sound generator 105 changes the pitch (the sound height) of the notification sound for the purpose of ensuring a certain S/N ratio in the frequency band of the notification sound, under control by the system controller 107 (step ST206).

The notification sound signal of the notification sound whose pitch has been changed is outputted from the speaker 10. Sounds in the vehicle including this notification sound are collected again by the microphone 20.

The sound signal analyzer 102 analyzes the mike input data collected by the microphone 20 (step ST207). For example, the sound signal analyzer analyzes whether or not the notification sound is included in the mike input data.

An abnormality determiner 103 determines whether or not the sound output in the system is normal on the basis of an analysis result acquired by the sound signal analyzer 102 (step ST208). For example, the abnormality determiner determines that an abnormality has occurred in the system when the notification sound is not collected, whereas the abnormality determiner determines that the system is normal when the notification sound is collected.

When determining that an abnormality has occurred in the system (when NO in step ST208), the abnormality determiner 103 notifies the system abnormality to the notification controller 104. When receiving the notification of the system abnormality from the abnormality determiner 103, the notification controller 104 issues a command to activate a second notifier to the system controller 107 (step ST209). The second notifier is activated according to the activate command from the notification controller 104, which is inputted thereto via the system controller 107, and makes a notification in a sensory manner other than an acoustic manner (step ST211).

In contrast, when the system is normal (when YES in step ST208), the abnormality determiner 103 notifies the notification controller 104 to this effect (step ST210).

When receiving the above-mentioned notification from the abnormality determiner 103, the notification controller 104 does not issue a command to activate the second notifier. After that, the notification controller ends the processing.

Figure 4:
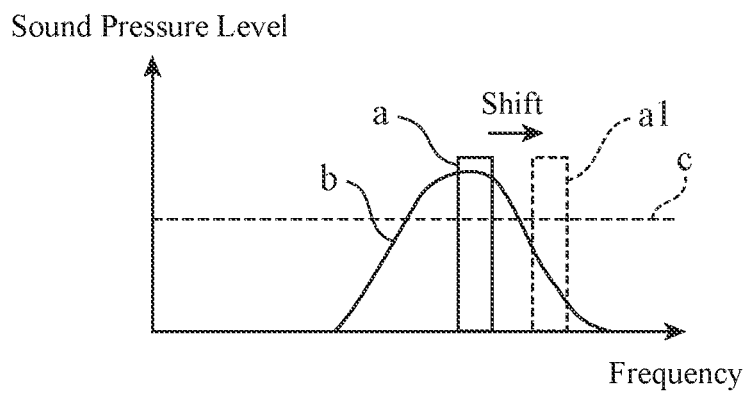
FIG. 4 is a diagram showing an overview of a change the pitch of a notification sound in Embodiment 2.

FIG. 4 is a diagram showing an overview of a change of the pitch of the notification sound in Embodiment 2, and shows a relation between the frequencies and the sound pressure levels of the notification sound and the ambient noise. The ambient noise is specified through an analysis of the mike input data stored in the mike input data storage 101 and collected during the fixed period of time preceding the current time. In FIG. 4, the frequency band of the ambient noise b, such as wind noise, overlaps that of the notification sound a and the noise level of the ambient noise exceeds the threshold c, because of, for example, the driver's driving with the vehicle's windows being open. Therefore, it is difficult for the driver to recognize the notification sound a.

In this case, the notification sound generator 105 generates a notification sound signal of a notification sound a1 whose frequency is shifted to one at which the noise level is lower than the threshold c, as shown in FIG. 4.

The notification sound a1 is acquired by changing only the pitch of the notification sound a, and inherits the tempo of the notification sound a, and so on just as they are, the tempo corresponding to the notification contents. Therefore, the driver can easily recognize the notification contents.

Further, the vehicle information notification device can estimate the S/N ratio of the notification sound whose pitch has been changed to the ambient noise, and, also when determining that this S/N ratio does not reach a permitted level, cause the second notifier to notify the information, like that according to Embodiment 1.

Figure 5:
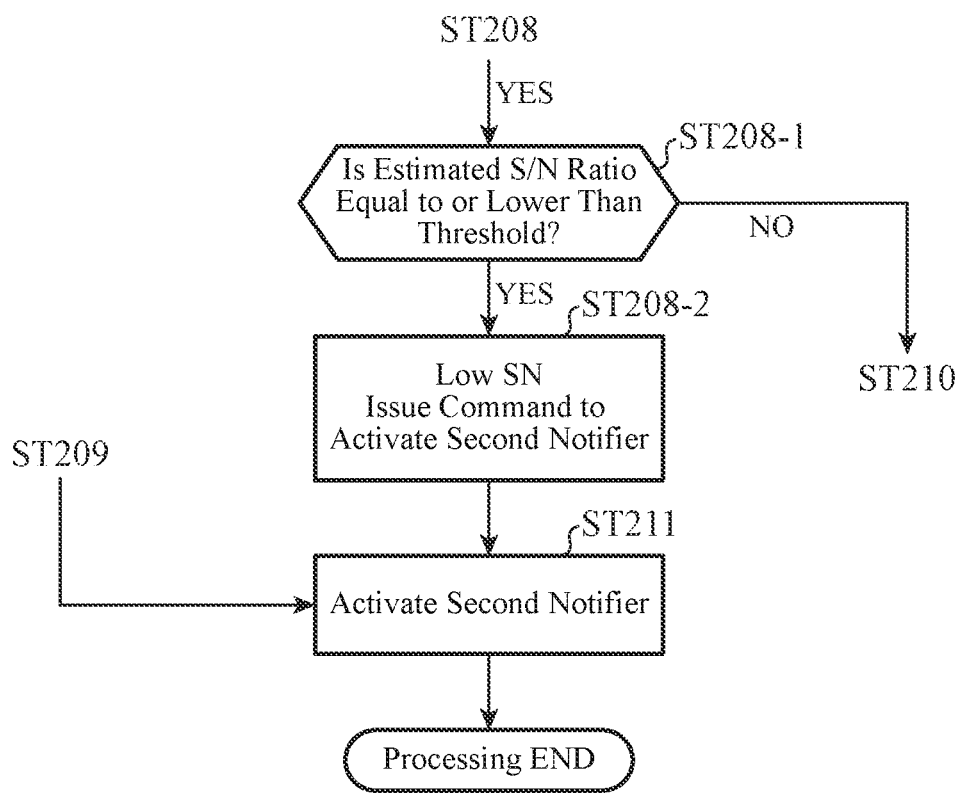
FIG. 5 is a flow chart showing another example of the operation of the vehicle information notification device according to Embodiment 2.

FIG. 5 is a flow chart showing another example of the operation of the vehicle information notification device according to Embodiment 2. In this flow chart, processing steps are added to the flow chart shown in FIG. 3.

When it is determined, in step ST208, that the system is normal, the abnormality determiner 103 determines whether the S/N ratio of the notification sound whose pitch has been changed to the ambient noise is equal to or lower than a predetermined threshold (step ST208-1).

When the S/N ratio of the notification sound to the ambient noise is equal to or lower than the threshold (when YES in step ST208-1), the abnormality determiner 103 notifies the notification controller 104 to this effect. When receiving the above-mentioned notification from the abnormality determiner 103, the notification controller 104 issues a command to activate the second notifier to the system controller 107 (step ST208-2). The second notifier is activated according to the above-mentioned activate command inputted thereto via the system controller 107, and makes a notification in a sensory manner other than an acoustic manner (step ST211).

As mentioned above, the vehicle information notification device according to this Embodiment 2 includes: the sound signal analyzer 102 to analyze the notification sound outputted from the first notifier, such as the speaker 10 and the notification sound generator 105; the system controller 107 to control the operation of the first notifier; the abnormality determiner 103 to determine an operation abnormality of the first notifier on the basis of an analysis result acquired by the sound signal analyzer 102; and the notification controller 104 to cause the second notifier, which notifies information in a sensory manner other than an acoustic manner, to notify information to passengers when it is determined that the first notifier is not operating normally, and, when the sound signal analyzer 102 determines that the noise level in the frequency band of the notification sound outputted by the first notifier is equal to or higher than the threshold, the system controller 107 changes the pitch of the notification sound.

Because the vehicle information notification device is configured in this way, the vehicle information notification device improves the accuracy of recognition of the notification sound even in the case in which the frequency components of the notification sound overlap those of the ambient noise. As a result, the vehicle information notification device can precisely notify information which requires the real-time nature for notification timing to passengers in the vehicle.

Further, according to this Embodiment 2, the sound signal analyzer 102 estimates the S/N ratio of the notification sound whose pitch has been changed by the system controller 107 to the ambient noise, the abnormality determiner 103 determines whether the S/N ratio reaches the permitted level when determining that the first notifier is operating normally, and the notification controller 104 causes the second notifier, which notifies information in a sensory manner other than an acoustic manner, to notify information also when it is determined that the S/N ratio does not reach the permitted level.

The vehicle information notification device thus activates the second notifier to make a notification in a sensory manner other than an acoustic manner in a situation in which it is difficult to catch the notification sound due to the ambient noise, like in the case of occurrence of a system abnormality. As a result, the vehicle information notification device can precisely notify information which requires the real-time nature for notification timing to passengers in the vehicle.

Embodiment 3

In Embodiment 3, when the ambient noise in the frequency band of a notification sound has a level which cannot be permitted, a notification sound generator 105 extends a period of time during which to output the notification sound.

While a vehicle information notification device according to Embodiment 3 has the configuration shown in Embodiment 1 basically, the internal processing of the notification sound generator 105 differs from that of the notification sound generator according to Embodiment 1. Therefore, the configuration of the vehicle information notification device according to Embodiment 3 will be explained with reference to FIG. 1.

Figure 6:
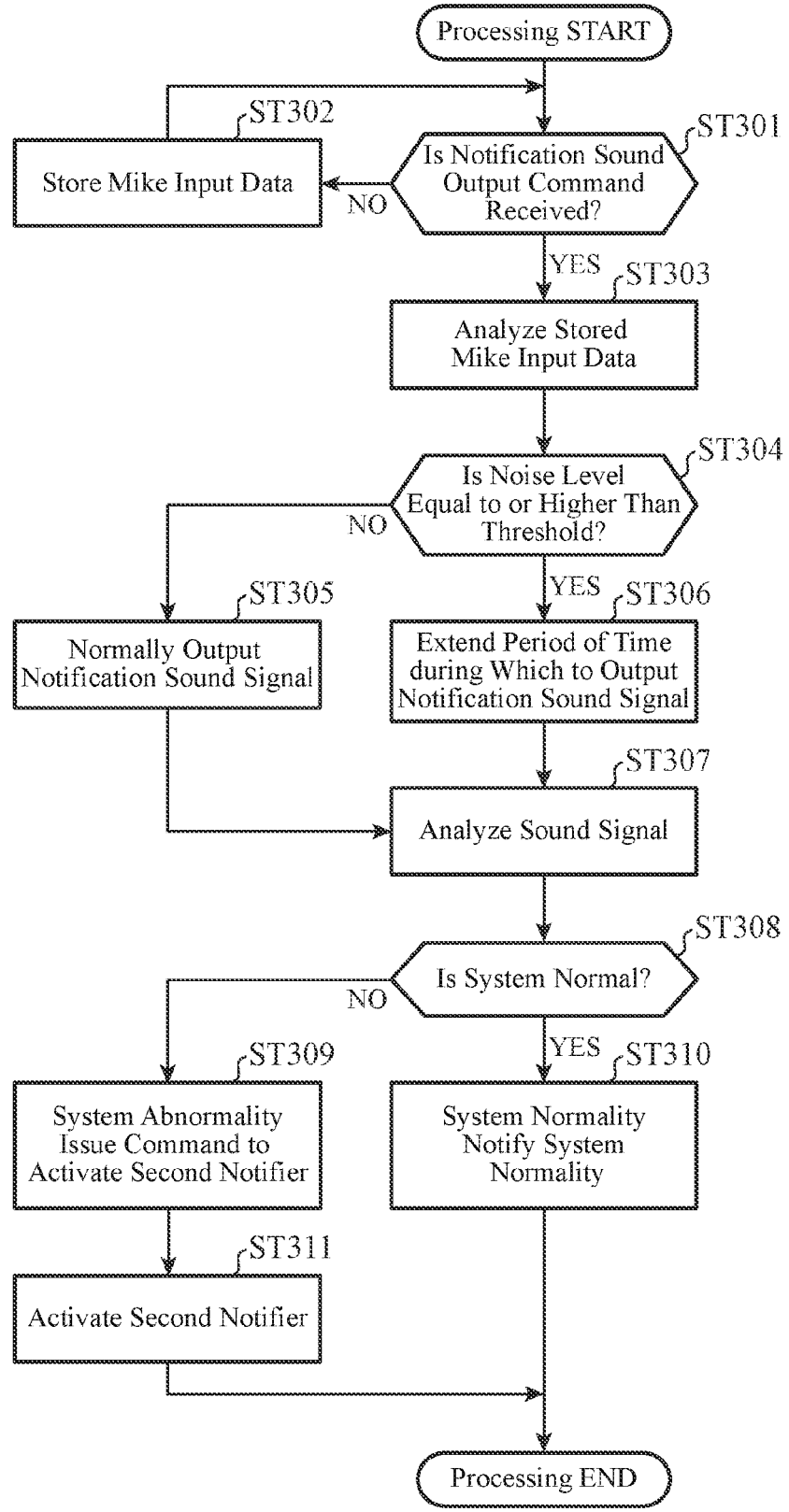
FIG. 6 is a flowchart showing the operation of a vehicle information notification device according to Embodiment 3 of the present invention.

FIG. 6 is a flowchart showing the operation of the vehicle information notification device according to Embodiment 3 of the present invention, and shows the details of a notifying process.

First, a mike input data storage 101 sequentially stores mike input data which has been collected by a microphone 20 during a fixed period of time (e.g., during approximately several seconds) preceding the current time (step ST302) while the notification sound generator 105 does not receive a notification sound output command from a system controller 107 (when NO in step ST301).

When the notification sound generator 105 receives a notification sound output command from the system controller 107 (when YES in step ST301), a sound signal analyzer 102 analyzes the mike input data stored in the mike input data storage 101 (step ST303). At this time, the sound signal analyzer 102 analyzes the noise level of ambient noise in the vehicle.

When the noise level of the ambient noise is lower than a threshold (when NO in step ST304), the sound signal analyzer 102 notifies the notification sound generator 105 and the system controller 107 to this effect.

When receiving the above-mentioned notification, the notification sound generator 105 reads the notification sound data about the notification contents specified by the notification sound output command received from the system controller 107 from a notification sound data storage 106, and generates a notification sound signal by using this notification sound data. The notification sound signal generated at this time is one of the notification sound which is predetermined by the notification sound data.

This notification sound signal is outputted normally from a speaker 10 (step ST305). Sounds in the vehicle including this notification sound are collected by the microphone 20.

In contrast, when the noise level of the ambient noise is equal to or higher than the threshold (when YES in step ST304), the sound signal analyzer 102 notifies the notification sound generator 105 and the system controller 107 to this effect.

When receiving the above-mentioned notification, the notification sound generator 105 extends the period of time (the output duration) during which to output the notification sound, under control by the system controller 107 (step ST306). For example, the notification sound generator extends the output period of time to twice its normal value.

The notification sound signal of the notification sound whose output period of time has been extended is outputted from the speaker 10. As a result, sounds in the vehicle including the notification sound are collected again by the microphone 20.

Subsequent processes in steps ST307 to ST311 are the same as those in steps ST207 to ST211 shown in FIG. 3 explained in Embodiment 2.

Figure 7:
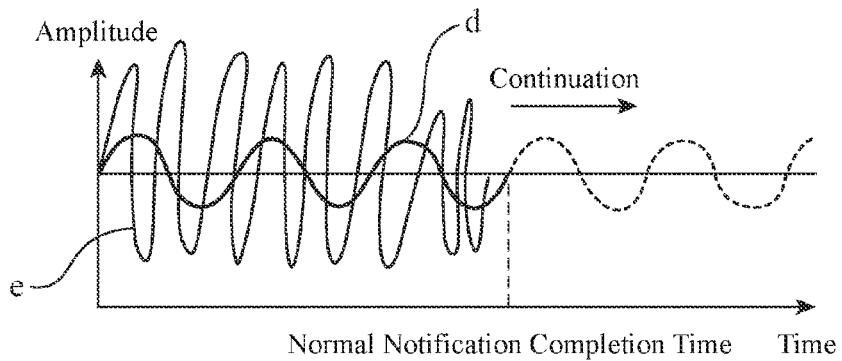
FIG. 7 is a diagram showing an overview of a process of extending the notification period of time of a notification sound in Embodiment 3.

FIG. 7 is a diagram showing an overview of extending the notification period of time of the notification sound in Embodiment 3, and shows a relation between the amplitudes of the notification sound and the ambient noise and a time. The ambient noise is specified through an analysis of the mike input data stored in the mike input data storage 101 and collected during the fixed period of time preceding the current time. In FIG. 7, because the noise level of the ambient noise e exceeds the threshold, it is difficult for the driver to recognize the notification sound d. In this case, the notification sound generator 105 extends the output period of time during which to output the notification sound d, as shown in FIG. 7. More specifically, even if the normal notification period of time of the notification sound d has elapsed, the notification sound generator continues outputting the notification sound. When the ambient noise e is unsteady temporary one, the notification sound generator can reduce the influence of the noise by extending the output period of time of the notification sound d.

Further, the vehicle information notification device can estimate the S/N ratio of the notification sound whose output period of time has been extended to the ambient noise, and, also when determining that this S/N ratio does not reach a permitted level, cause a second notifier to notify information, like that according to Embodiment 1.

In addition, the processes according to Embodiment 2 can be combined with those according to Embodiment 3.

Figure 8:
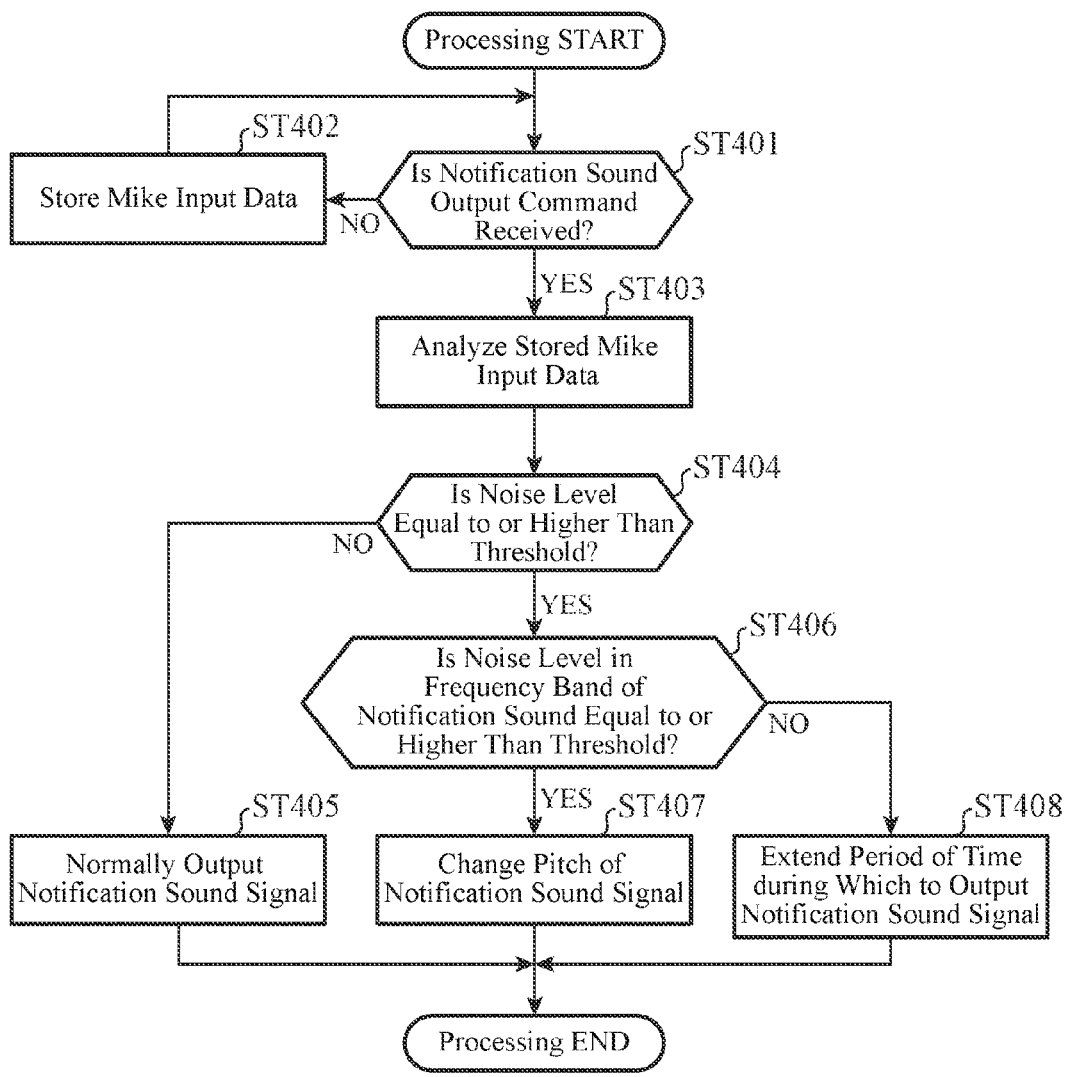
FIG. 8 is a flow chart showing another example of the operation of the vehicle information notification device according to Embodiment 3.

FIG. 8 is a flow chart showing another example of the operation of the vehicle information notification device according to Embodiment 3. Processes in steps ST401 to ST409 are the series of processes which is the combination of the processes according to Embodiment 2 and those according to Embodiment 3, and are replaced by either the series of processes leading to step ST208 of FIG. 3 or the series of processes leading to step ST308 of FIG. 6.

First, the mike input data storage 101 sequentially stores mike input data which has been collected by the microphone 20 during the fixed period of time (e.g., during approximately several seconds) preceding the current time (step ST402) while the notification sound generator 105 does not receive a notification sound output command from the system controller 107 (when NO in step ST401).

When the notification sound generator 105 receives a notification sound output command from the system controller 107 (when YES in step ST401), the sound signal analyzer 102 analyzes the mike input data stored in the mike input data storage 101 (step ST403). At this time, the sound signal analyzer 102 analyzes the sound pressure level of the ambient noise in the vehicle.

When the noise level of the ambient noise is lower than the threshold (when NO in step ST404), the sound signal analyzer 102 notifies the notification sound generator 105 and the system controller 107 to this effect.

When receiving the above-mentioned notification, the notification sound generator 105 reads the notification sound data about the notification contents specified by the notification sound output command received from the system controller 107 from the notification sound data storage 106, and generates a notification sound signal by using this notification sound data. The notification sound signal generated at this time is one of the notification sound which is predetermined by the notification sound data.

This notification sound signal is outputted normally from the speaker 10 (step ST405).

In contrast, when the noise level of the ambient noise is equal to or higher than the threshold (when YES in step ST404), the sound signal analyzer 102 determines whether or not the noise level in the frequency band of the notification sound is equal to or higher than the threshold (step ST406).

When the noise level in the frequency band of the notification sound is lower than the threshold (when NO in step ST406), the sound signal analyzer 102 notifies the notification sound generator 105 and the system controller 107 to this effect.

When receiving the above-mentioned notification, the notification sound generator 105 changes the pitch (the sound height) of the notification sound under control by the system controller 107 (step ST407). The notification sound signal of the notification sound whose pitch has been changed is outputted from the speaker 10.

When the noise level of the ambient noise is lower than the threshold (when NO in step ST404), the sound signal analyzer 102 notifies the notification sound generator 105 to this effect. When receiving the above-mentioned notification, the notification sound generator 105 extends the period of time (the output duration) during which to output the notification sound (step ST408). The notification sound signal of the notification sound whose output period of time has been extended is outputted from the speaker 10.

The sound signal analyzer 102 analyzes whether or not the notification sound is included in the mike input data collected by the microphone 20 (step ST409).

As mentioned above, the vehicle information notification device according to this Embodiment 3 includes: the sound signal analyzer 102 to analyze the notification sound outputted from the first notifier, such as the speaker 10 and the notification sound generator 105; the system controller 107 to control the operation of the first notifier; the abnormality determiner 103 to determine an operation abnormality of the first notifier on the basis of an analysis result acquired by the sound signal analyzer 102; the notification controller 104 to cause the second notifier that notifies information in a sensory manner other than an acoustic manner to notify information when it is determined that the first notifier is not operating normally, and, when the sound signal analyzer 102 determines that the noise level of the ambient noise is equal to or higher than the threshold, the system controller 107 extends the period of time during which to output the notification sound. Because the vehicle information notification device is configured in this way, the vehicle information notification device improves the accuracy of recognition of the notification sound even in the case in which the noise level of the ambient noise is equal to or higher than the threshold. As a result, the vehicle information notification device can precisely notify information which requires the real-time nature for notification timing to passengers in the vehicle.

Further, according to this Embodiment 3, the sound signal analyzer 102 estimates the S/N ratio of the notification sound whose output period of time has been extended by the system controller 107 to the ambient noise, the abnormality determiner 103 determines whether the S/N ratio reaches the permitted level when determining that the first notifier is operating normally, and the notification controller 104 causes the second notifier to notify information to passengers also when it is determined that the S/N ratio does not reach the permitted level.

The vehicle information notification device thus activates the second notifier to make a notification in a sensory manner other than an acoustic manner in a situation in which it is difficult to catch the notification sound due to the ambient noise, like in the case of occurrence of a system abnormality. As a result, the vehicle information notification device can precisely notify information which requires the real-time nature for notification timing to passengers in the vehicle.

In addition, according to this Embodiment 3, the sound signal analyzer 102 determines whether or not the noise level in the frequency band of the notification sound outputted by the first notifier is equal to or higher than the threshold when determining that the noise level of the ambient noise is equal to or higher than the threshold, and the system controller 107 changes the pitch of the notification sound when the noise level of the ambient noise is equal to or higher than the threshold and the noise level in the frequency band of the notification sound is equal to or higher than the threshold, and extends the period of time during which to output the notification sound when the noise level of the ambient noise is equal to or higher than the threshold and the noise level in the frequency band of the notification sound is lower than the threshold.

Because the vehicle information notification device is configured in this way, the vehicle information notification device improves the accuracy of recognition of the notification sound even in the case in which the noise level of the ambient noise is equal to or higher than the threshold and even in the case in which the frequency components of the notification sound overlap those of the ambient noise. As a result, the vehicle information notification device can precisely notify information which requires the real-time nature for notification timing to passengers in the vehicle.

While the present invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

Because the vehicle information notification device according to the present invention can precisely notify information which requires the real-time nature for notification timing to passengers in the vehicle, the vehicle information notification device is suitable for use as, for example, an information device that notifies driving support information of a driving supporting device.

EXPLANATIONS OF REFERENCE NUMERALS

10 speaker, 20 microphone, 30 vehicle-mounted display, 40 vehicle controller, 50 vehicle-mounted equipment, 101 mike input data storage, 102 sound signal analyzer, 103 abnormality determiner, 104 notification controller, 105 notification sound generator, 106 notification sound data storage, 107 system controller, and 108 information display data generator.

The invention claimed is:

1. A vehicle information notification device that can switch between a first notifier to output a notification sound, thereby notifying information to passengers in a vehicle in an acoustic manner, and a second notifier to notify information in a sensory manner other than an acoustic manner, to make a notification of information, said vehicle information notification device comprising:
   a sound signal analyzer to analyze the notification sound outputted from said first notifier;
   a first notification controller to control an operation of said first notifier;
   an abnormality determiner to determine an operation abnormality of said first notifier on a basis of an analysis result acquired by said sound signal analyzer, and to, when determining that said first notifier is operating normally, determine whether an S/N ratio of the notification sound outputted from said first notifier to ambient noise reaches a permitted level; and
   a second notification controller to cause said second notifier to notify information when it is determined that said first notifier is not operating normally or that said S/N ratio does not reach the permitted level.

2. A vehicle information notification device that can switch between a first notifier to output a notification sound, thereby notifying information to passengers in a vehicle in an acoustic manner, and a second notifier to notify information in a sensory manner other than an acoustic manner, to make a notification of information, said vehicle information notification device comprising:
   a sound signal analyzer to analyze the notification sound outputted from said first notifier;
   a first notification controller to control an operation of said first notifier;
   an abnormality determiner to determine an operation abnormality of said first notifier on a basis of an analysis result acquired by said sound signal analyzer; and
   a second notification controller to, when it is determined that said first notifier is not operating normally, cause the second notifier, which notifies information in a sensory manner other than an acoustic manner, to notify information to said passengers,
   wherein when said sound signal analyzer determines that a noise level in a frequency band of the notification sound outputted by said first notifier is equal to or higher than a threshold, said first notification controller changes a pitch of the notification sound.

3. The vehicle information notification device according to claim 2, wherein said sound signal analyzer estimates an S/N ratio of the notification sound whose pitch has been changed by said first notification controller to ambient noise, said abnormality determiner determines whether said S/N ratio reaches a permitted level when determining that said first notifier is operating normally, and said second notification controller causes said second notifier to notify the information also when it is determined that said S/N ratio does not reach the permitted level.

4. A vehicle information notification device that can switch between a first notifier to output a notification sound, thereby notifying information to passengers in a vehicle in an acoustic manner, and a second notifier to notify information in a sensory manner other than an acoustic manner, to make a notification of information, said vehicle information notification device comprising:
   a sound signal analyzer to analyze the notification sound outputted from said first notifier;
   a first notification controller to control an operation of said first notifier;
   an abnormality determiner to determine an operation abnormality of said first notifier on a basis of an analysis result acquired by said sound signal analyzer; and
   a second notification controller to, when it is determined that said first notifier is not operating normally, cause the second notifier, which notifies information in a sensory manner other than an acoustic manner, to notify information,
   wherein when said sound signal analyzer determines that a noise level of ambient noise is equal to or higher than a threshold, said first notification controller extends a period of time during which to output the notification sound.

5. The vehicle information notification device according to claim 4, wherein said sound signal analyzer estimates an S/N ratio of the notification sound whose output period of time has been extended by said first notification controller to the ambient noise, said abnormality determiner determines whether said S/N ratio reaches a permitted level when determining that said first notifier is operating normally, and said second notification controller causes said second notifier to notify the information also when it is determined that said S/N ratio does not reach the permitted level.

6. The vehicle information notification device according to claim 4, wherein when determining that the noise level of the ambient noise is equal to or higher than the threshold, said sound signal analyzer determines whether a noise level in a frequency band of the notification sound outputted by said first notifier is equal to or higher than the threshold, and said first notification controller changes a pitch of the notification sound when the noise level of the ambient noise is equal to or higher than the threshold and the noise level in the frequency band of the notification sound is equal to or higher than the threshold, and extends the period of time during which to output the notification sound when the noise level of the ambient noise is equal to or higher than said threshold and the noise level in the frequency band of the notification sound is lower than said threshold.

* * * * *